Aug. 6, 1940.     G. HAYWOOD     2,210,405
CALCIUM SULPHITE AND METHOD FOR PRODUCING THE SAME
Filed Dec. 8, 1934
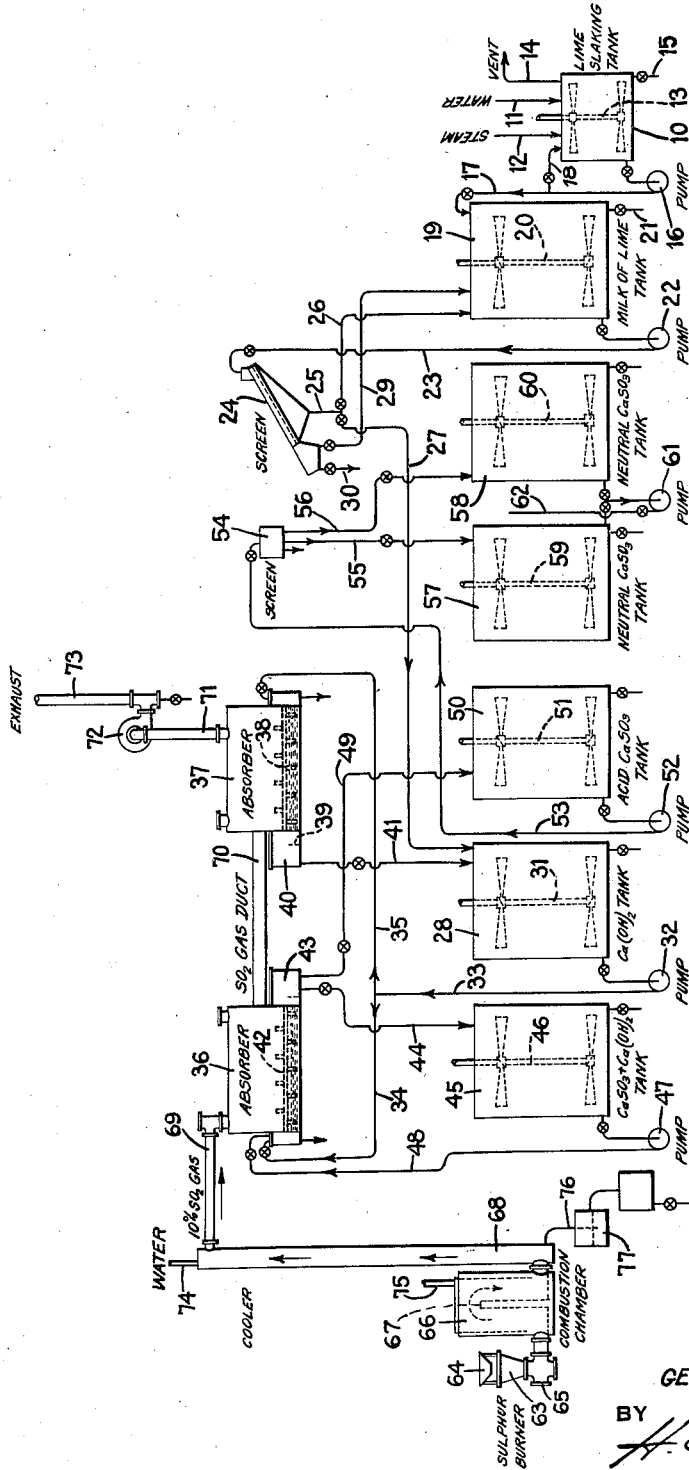
INVENTOR
GERALD HAYWOOD
BY
H. C. Liesing
ATTORNEY Patented Aug. 6, 1940

2,210,405

UNITED STATES PATENT OFFICE 2,210,405

CALCIUM SULPHITE AND METHOD FOR PRODUCING THE SAME

Gerald Haywood, Westernport, Md., assignor, by mesne assignments, to West Virginia Pulp & Paper Company, New York, N. Y., a corporation of New York Application December 8, 1934, Serial No. 756,631

11 Claims. (Cl. 23—129)

This invention relates to the production of calcium sulphite, more particularly in a finely divided, light precipitated state. It has to do with the method used for this purpose and the improved product itself. The present application is a continuation in part of my application Ser. No. 660,032 filed March 8, 1933, now Patent 1,984,188, and includes a divisable part of the invention disclosed in said application.

It has been a particular object of the invention to produce finely divided calcium sulphite in such a state and in such an inexpensive and efficient manner, with the requisite degree of purity, to enable its use as an inert filling agent in a variety of different products. In the proper conduct of the present process it is possible to produce the material with a substantially uniform particle size of approximately two microns. This makes the product exceptionally satisfactory as a filler for high-grade papers and a filler or main ingredient of a coating forming part of coated papers. It may also be used in paints and a variety of other products requiring fine fillers.

Briefly, the preferred method of forming the improved product involves bringing into intimate relation a fine mist or spray of milk of lime and an atmosphere rich in sulphur dioxide. The milk of lime may be produced in any suitable way, as by burning limestone to form lime and then slaking the latter to provide a suspension of desired concentration. This is then whipped or otherwise formed into a fine spray in an atmosphere having a high percentage of sulphur dioxide, preferably formed by burning sulphur. The reaction to produce calcium sulphite in this way may be conducted in one or several stages, preferably with continuous circulation of the suspension between a tank and an absorber or reaction vessel in each stage. The resulting suspension of calcium sulphite will be somewhat acid due to the presence of sulphur dioxide in solution. This may be neutralized in any convenient may by the addition of a suitable alkali. To eliminate particles of grit and the like, the product may be screened either before or after neutralization.

In lieu of employing milk of lime the original calcium carbonate, such as limestone, may be finely ground and placed in suspension for direct reaction with the sulphur dioxide. Lime mud may, if desired, form a cheap source for the calcium carbonate used. The reaction in this case proceeds by the replacement of the carbonate radical by the sulphite radical. Furthermore, the atmosphere containing sulphur dioxide need not be derived from the burning of sulphur but may be simply the waste gases of some industrial operations in which a fair percentage of sulphur dioxide is developed.

For best results and the finest particle sizes it is desirable to employ a concentrated milk of lime suspension and a relatively high percentage of sulphur dioxide in the reacting atmosphere. If a weak milk of lime suspension is employed, there is a tendency to produce a crystalline structure of rather large particle size.

With the foregoing objects, advantages and general mode of operation in view, the novel method of producing the improved product will now be described in detail in connection with an illustrative form of apparatus shown diagrammatically in the accompanying drawing.

Referring now to the drawing, a tank 10 indicated at the extreme righthand end of the figure is arranged to receive a charge of lime from any suitable source. It may be assumed, for example, that this lime is produced by the appropriate burning of limestone in a kiln, not illustrated. As previously stated, the process may be so conducted as to react sulphur dioxide directly with calcium carbonate. In that event the charge introduced into the tank 10 will be a finely ground limestone rather than lime. Water is introduced into the tank through a pipe 11 while an appropriate amount of steam may be supplied through a pipe 12 to facilitate the slaking. The mixture of water and lime or limestone is throughly mixed by means of any suitable form of agitator, such as indicated at 13. The vapors generated due to the slaking of the lime and the introduction of the steam may be withdrawn through a vent 14. Whenever required, the tank may be completely drained and cleaned through the use of a drainage pipe 15.

After the lime has been thoroughly slaked, or the limestone has been put into suspension in the water, the mixture is withdrawn, as by means of a pump 16, which serves to pass it through a pipe 17 or a branch 18, depending upon the adjustment of the valves indicated. Thus, if desired, the material may simply be withdrawn and returned to the tank 10 through branch 18 to assist in bringing the fine particles into suspension. However, when the mixture is in satisfactory condition, it is passed through the line 17 into a tank 19 where the agitation of the milk of lime or the suspension of limestone is continued by means of an agitator 20. If desired, the valves in the lines 17 and 18 may each be partially open so that one portion of the suspension will be returned to tank 10 while another portion will be passed into the tank 19 in the manner explained. A suitable drain 21 at the bottom of tank 19 enables the complete drainage and cleaning out of this tank.

A pump 22 serves to draw the milk of lime from the bottom of tank 19 and pass it through a line 23 to the top of a suitable screen 24. This may be of any suitable mesh, say, about 150 mesh, and will serve to separate the larger particles of grit and lime or limestone from the finer suspension. The latter, passing through the screen, enters a pipe 25 by which it may be passed either through a line 26 back to the tank 19 or through a line 27 to another tank 28. The valves shown in the lines 26 and 27 may be suitably operated to control the flow of the material, as desired. Ordinarily the material will be passed through the line 27 so long as the rest of the equipment is capable of handling the material so supplied. The larger particles passing off at the end of the screen 24 may be returned through a line 29 to the tank 19 or may be passed to the sewer, or any other point of disposal, through a line 30.

Within the tank 28 the screened milk of lime is agitated further by means of an agitator 31. A pump 32 serves to withdraw the material from the bottom of the tank and pass it through a line 33 into either of a pair of branches 34 and 35. The branch 24 is connected with the intake of an absorber 36 of any suitable construction. In a similar way the branch 35 is connected with the intake of an absorber 37. Ordinarily the material withdrawn from the tank 28 will first be passed into the absorber 37, although, if desired, the valves illustrated may each be partially opened so that a portion of the material is passed into each of the absorbers.

In the preferred construction the liquid suspension is maintained at a comparatively low level within the absorber 37 so that a relatively large gas space is provided above the surface of the liquid. An agitator 38, having a series of arms rapidly rotated through the liquid by a motor (not shown) or other suitable means, serves to vigorously agitate the liquid and throw the latter, in the form of a fine mist, into the gas space. It will be understood that this gas space will be supplied with an atmosphere containing a relatively high percentage of sulphur dioxide, by means to be later explained. This results in a reaction between the milk of lime or the limestone suspension and the sulphur dioxide by virtue of which calcium sulphate is produced. The level of the liquid in the absorber 37 is governed by a baffle 39 in an outlet box 40. As the liquid passes over the baffle, it enters the pipe 41, by which it is returned to the tank 28.

Accordingly, in the operation of the system the liquid suspension is continuously circulated through the absorber 37 until the reaction producing calcium sulphate has been carried on to a desirable extent. At this time the valve in the line 35 may be closed and the valve in the line 34 may be opened so that the partially converted material in tank 28 is passed to the absorber 36.

Within the absorber 36 an agitator 42, similar to the agitator 38, is provided to whip the suspension into a fine mist so that the reaction with the sulphur dioxide may be carried on to completion. A part of the liquid is continuously withdrawn from the absorber 36 at the outlet box 43, which is connected by a line 44 with a tank 45. An agitator 46, within the latter, serves to continue the stirring of the liquid to maintain the fine particles in suspension. A pump 47 continuously withdraws liquid from the bottom of the tank 45 and passes it through a line 48 to the intake of the absorber 36. In this way continuous circulation of the liquid is maintained between the absorber 36 and the tank 45.

When the reaction between the milk of lime or limestone suspension and sulphur dioxide is substantially complete, the mixture may be withdrawn from the outlet box 43 through a line 49 communicating with a tank 50. Valves in the lines 44 and 49 may be suitably adjusted for this purpose. For the production of extremely fine particles, it has been found desirable to effect a relatively rapid rate of reaction between the liquid and gas. This reaction may suitably be carried on to the extent of about 40% completion upon each pass through the absorbers. If the material is circulated at such a rate that about three hours are required to complete a pass, the entire operation upon a given batch will take about eight hours. This is a satisfactory rate for fine particle production. The reaction should be permitted to continue until the suspension in the absorber 36 becomes slightly acid, indicating the presence of an excess of sulphur dioxide in solution. At this time the material should be passed from the absorber to the tank 50, as indicated. When all of the material has been passed from the tank 45 through absorber 36 and into tank 50, the material from tank 28 will ordinarily be diverted from the absorber 37 to absorber 36 in the manner explained. In this way an appropriate proportion of the reaction will take place in each stage.

Since the material in the tank 50 is in an acid condition, it will be preferable to form this tank of wood, or other acid-resistant material, while the remaining tanks may be formed of steel.

The suspension of the fine particles is maintained in the tank 50 by an agitator 51. In this tank the calcium sulphite is preferably neutralized by the introduction of a suitable quantity of an alkali, such as caustic soda, calcium carbonate, or milk of lime. It will not be necessary to add a great deal of alkali since the material is only slightly acid and only sufficient alkali to make the material neutral should be added. By first producing an acid suspension and then neutralizing it in this way, maximum conversion of the lime or calcium carbonate is insured.

Provision is made for withdrawing the mixture from the tank 50 by means of a pump 52 which passes it through a line 53 to a screen 54. The latter may be of any suitable construction, preferably of the gyratory type and preferably of a relatively fine mesh, for example 200 mesh. The screened material may be passed through either or both of lines 55 and 56 to tanks 57 and 58. In these tanks the material is also continuously stirred by agitators 59 and 60. Ordinarily the tanks 57 and 58 will be used alternately so that one may be in operation while the other is being cleaned. A pump 61 is arranged to communicate with both of the tanks 57 and 58, either jointly or singly, to withdraw the calcium sulphite and pass it through a line 62 to a paper machine, or any other suitable point of disposition. If the material is to be shipped, it should first be dewatered to reduce it to a thick paste or a dry powder. However, if it is to be used near the source of manufacture in a watery suspension, it may be used directly as it appears in tanks 57 and 58.

Now, to provide the desired atmosphere rich in sulphur dioxide in the absorbers, a sulphur burner 63, of any suitable form, is preferably employed. Sulphur may be supplied in any convenient way to a hopper 64 associated with the burner. The sulphur in a finely divided state will ordinarily descend through a series of grids into a stream of air supplied through the inlet 65. Ignition of the sulphur will take place in the burner 63 and the mixture of ignited sulphur and air will be drawn or forced into a combustion chamber 66. A baffle member 67 within the latter causes the mixture of air and sulphur to follow the path indicated by the arrow and upon substantial completion of the combustion, the products will be withdrawn from the bottom of the chamber into the bottom of a tower 68. In rising through the latter, the combustion gases will be cooled to a certain extent and will then be passed through a pipe 69 to the top of the absorber 36. The gas so supplied will be between 7 and 20% sulphur dioxide and will be admirably suited for the process. At the opposite end of the absorber 36 a duct 70 is provided to convey the gas to the absorber 37. A pipe 71 then connects the opposite end of this absorber with an exhaust pump 72 which discharges the gas through a pipe 73 into the atmosphere or into any suitable disposal system. It will be understood that a large portion of the sulphur dioxide will be withdrawn from the gas by the reactions in the absorbers 36 and 37.

It is believed that the operation of the system disclosed in the drawing will be clear from the foregoing. If milk of lime is used as the agent to react with the sulphur dioxide, it should preferably be maintained at a concentration of about 110 grams of lime per litre. This may, of course, be varied but it has been found that a relatively high concentration of the character mentioned is best suited for the production of a uniformly fine product. Reasonably good results may be obtained from the use of between ½ and 1½ pounds of lime per gallon of water and quantities even outside of these limits are not to be considered outside of the scope of the present invention. It is not necessary to cool the products of the reaction in the absorbers and, in fact, a finer product appears to result from the production of a relatively high temperature within these chambers. For this reason the reaction should be carried on at a sufficiently rapid rate to insure a temperature rise. This temperature under ordinary conditions will usually rise to about 70° C. If desired, the combustion gases rising in the chamber 68 may be cooled to a certain extent by water introduced into the tower through a pipe 74. This, however, is not essential and may be dispensed with, if desired. There is no objection to introducing the gases into the absorber at a temperature of between 400° and 550° C. The combustion of the sulphur may be arrested and the gases cooled to a limited extent, if desired, adjacent the discharge end of the combustion chamber 66 by introducing water through a pipe 75. If water is introduced into the tower 68 or the chamber 66, this may be withdrawn from the bottom of the tower 68 through a line 76 discharging through a water seal provided by a small tank 77.

The calcium sulphite manufactured in accordance with the present invention has physical properties and characteristics rendering it especially suitable for use as a filler in paper. For example, it has a whiteness closely approaching that of magnesium carbonate, which is normally used as a standard of comparison in the evaluation of whiteness. The calcium sulphite has a reflection factor of more than 98% and it reflects all portions of the spectrum equally well. There is no selective absorption to detract from the whiteness of reflected white light. The improved product, furthermore, may be made extremely fine and of highly uniform particle size. If the process is properly conducted the major portion of the particles, even as high as 95%, may be produced with a diameter of substantially two microns and practically none of the particles will exceed 5 microns. The fineness of the product may be further demonstrated by a bulk test. In a test of this sort five grams of the fine calcium sulphite were shaken up in 100 c. c. of a .1% starch solution and allowed to stand for 24 hours; the volume of the settled particles at the end of that period was 17 c. c. A corresponding amount of finely divided clay under the same conditions settled down to 8 c. c. It will be apparent from this that a product which settles less than to 10 c. c. under the conditions mentioned is extremely fine, i. e., finer than the ordinary clay filler.

From the standpoint of opacity the new product is also noteworthy. By the use of a Konig-Martens polarization photometer the percent opacity has been determined for each of a series of films of calcium sulphite formed by drying down a suspension on a plate and having weights of 45 lbs., 22.5 lbs., 11.25 lbs., 9 lbs., 4.5 lbs., and 2.25 lbs., based upon 500 sheets of 25″ x 38″ dimension. The calcium sulphite used in these tests was produced under the preferred conditions mentioned from milk of lime containing 100 grams of lime per litre. The total of the six percentages so determined gave an opacity figure of 384. A finely divided clay filler under the same conditions gave an opacity figure of 338. The fine calcium sulphite, therefore, was nearly 14% more opaque then the clay.

While an illustrative form of apparatus and preferred mode of operation have been described in considerable detail, it will be understood that numerous variations may be made in both without departing from the general spirit and scope of the invention. When reference is made herein or in the claims to a lime bearing suspension or a suspension of a lime bearing substance, it should be understood to include not only milk of lime but a suspension of calcium carbonate, or the like, as well.

What I claim is:

1. A method of producing finely divided calcium sulphite which comprises bringing a concentrated milk of lime suspension containing about one pound of lime per gallon in a fine spray into an atmosphere rich in sulphur dioxide, reacting said suspension and sulphur dioxide until said lime is substantially completely converted to calcium sulphite, and stopping said reaction before said suspension becomes more than slightly acid.

2. A method of producing finely divided calcium sulphite which comprises bringing a relatively concentrated milk of lime suspension, containing between 0.5 and 1.5 lbs. of lime per gallon of water in a fine spray into a heated atmosphere formed by the combustion of sulphur in air only until said lime suspension is substantially completely converted to calcium sulphite, and arresting the reaction after the conversion is substantially completed, the concentration of the milk of lime, the temperature of said atmosphere and the character of the spray being such as to bring about precipitation of the calcium sulphite in a finely divided state with substantially all of its particles less than five microns in diameter.

3. A method of producing finely divided calcium sulphite which comprises forming milk of lime containing 0.5 to 1.5 lbs. of lime per gallon of water, and bringing said milk of lime in a fine spray into an atmosphere rich in sulphur dioxide until said lime suspension is substantially completely converted to calcium sulphite, and continuing the reaction only until the conversion is substantially completed, the concentration of the milk of lime, the temperature of the atmosphere rich in SO₂ and the character of the spray being such as to bring about precipitation of the calcium sulphite in such a fine state as to render the same suitable for use as a filler for paper.

4. A method of producing finely divided calcium sulphite which comprises forming milk of lime containing 0.5 to 1.5 lbs. of lime per gallon of water, and bringing said milk of lime in a fine spray into an atmosphere containing between 7% and 20% sulphur dioxide only until said lime suspension is substantially completely converted to calcium sulphite, and arresting the reaction as the conversion is substantially completed, the concentration of the milk of lime, the temperature of the atmosphere rich in SO₂ and the character of the spray being such as to bring about precipitation of the calcium sulphite in such a fine state as to render the same suitable for use as a filler for paper.

5. A method of producing finely divided calcium sulphite which comprises forming a relatively concentrated lime bearing suspension with finely divided solid particles to an extent equivalent to 0.5 to 1.5 lbs. of lime per gallon and whipping said suspension into a fine spray in a heated atmosphere rich in sulphur dioxide only until said suspension is substantially completely converted to calcium sulphite, the concentration of the suspension, the temperature of the atmosphere rich in SO₂ and the character of the spray being such as to bring about precipitation of the calcium sulphite in such a fine state as to render the same suitable for use as a filler for paper.

6. In a method of producing finely divided calcium sulphite suitable for use as a filler in paper, the steps comprising forming a relatively concentrated lime bearing suspension with finely divided solid particles, said suspension containing the equivalent of between 0.5 and 1.5 lbs. of lime per gallon of water, passing said suspension first into one and then into another of a plurality of chambers, producing a fine spray of the suspension in each of said chambers, and passing an atmosphere rich in sulphur dioxide successively through said chambers in countercurrent relation to the suspension, the reaction between the solid particles and the sulphur dioxide being continued in said chamber only until the particles are substantially completely converted into calcium sulphite, the concentration of the suspension, the temperature of said atmosphere and the character of the spray being such as to bring about precipitation of the calcium sulphite in a finely divided state with substantially all of its particles less than five microns in diameter.

7. A method of producing finely divided calcium sulphite which comprises forming a lime bearing suspension with finely divided solid particles containing the equivalent of between 0.5 and 1.5 lbs. of lime per gallon of suspension, bringing said suspension as a fine spray into intimate contact with an atmosphere rich in sulphur dioxide until the suspension becomes only slightly acid, and then adding an alkali to neutralize the mixture, the concentration of the suspension, the temperature of the atmosphere rich in SO₂ and the character of the spray being such as to bring about precipitation of the calcium sulphite in such a fine state as to render the same suitable for use as a filler for paper.

8. A method of producing finely divided calcium sulphite which comprises forming a concentrated suspension of a finely divided lime bearing substance containing the equivalent of between 0.5 and 1.5 lbs. of lime per gallon of suspension, vigorously agitating said suspension in the presence of sulphur dioxide, and producing a reaction at such a rate and under such conditions that the temperature of the suspension will rise appreciably, but continuing said reaction only until said solids are substantially completely converted to calcium sulphite, the concentration of the suspension, the temperature of the atmosphere rich in SO₂ and the character of the spray being such as to bring about precipitation of the calcium sulphite in such a fine state as to render the same suitable for use as a filler for paper.

9. A method of producing finely divided calcium sulphite suitable for use as a filler in paper, comprising preparing a slurry of lime and water containing between 0.5 and 1.5 lbs. of lime per gallon by mixing finely divided lime with water and separating the coarse particles from the slurry, reacting said slurry with a heated atmosphere rich in sulphur dioxide while whipping the slurry to increase the speed of reaction, and arresting the reaction before said slurry becomes more than slightly acid, the concentration of the milk of lime, the temperature of the atmosphere rich in SO₂ and the character of the spray being such as to bring about precipitation of the calcium sulphite in such a fine state as to render the same suitable for use as a filler for paper.

10. As an article of manufacture calcium sulphite having a whiteness closely approaching that of magnesium carbonate and an opacity greater than that of regular paper filler clay, said calcium sulphite being suitable for use as a paper filler and being chemically formed in a finely divided state with substantially all of its particles of substantially uniform size, said size being approximately two microns in diameter.

11. As an article of manufacture calcium sulphite having a whiteness closely approaching that of magnesium carbonate and an opacity greater than that of regular paper filler clay, said calcium sulphite being suitable for use as a paper filler and being chemically formed in a finely divided state with substantially all of its particles less than five microns in diameter.

GERALD HAYWOOD.